June 26, 1962  IB H. SVENDSEN  3,040,853
OVERRUNNING CLUTCH

Filed Jan. 13, 1961  2 Sheets-Sheet 1

Inventor
Ib H. Svendsen
By Ira Milton Jones
Attorney

June 26, 1962 — IB H. SVENDSEN — 3,040,853
OVERRUNNING CLUTCH
Filed Jan. 13, 1961 — 2 Sheets-Sheet 2
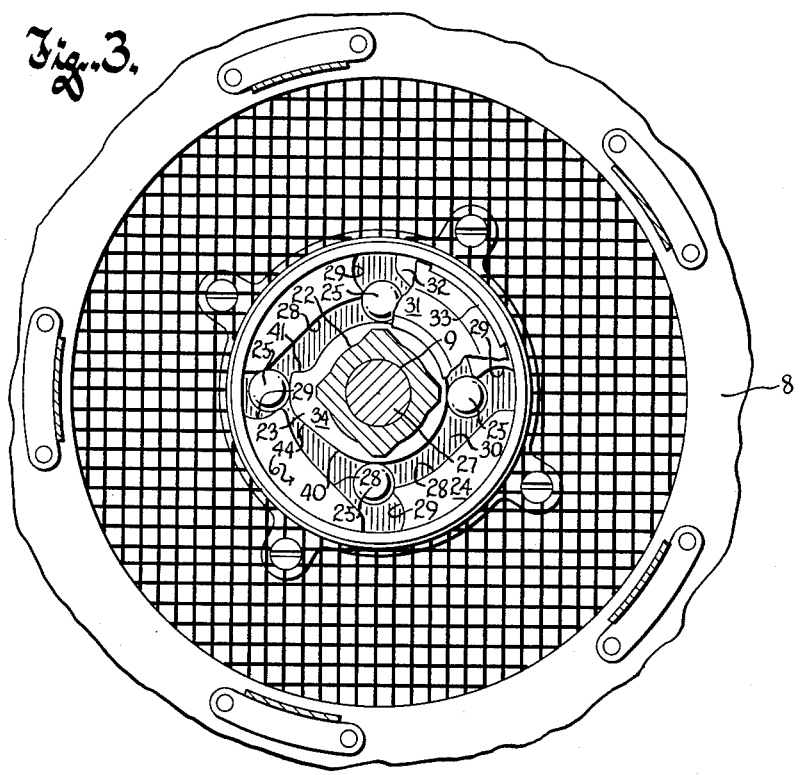
Fig. 3.
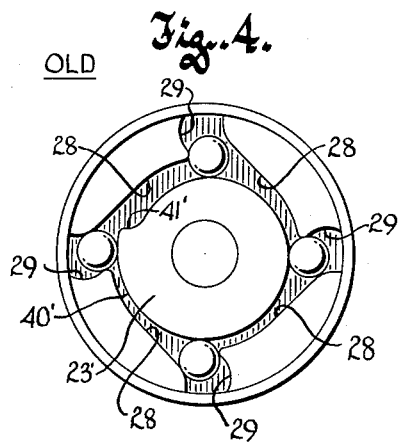
Fig. 4. OLD
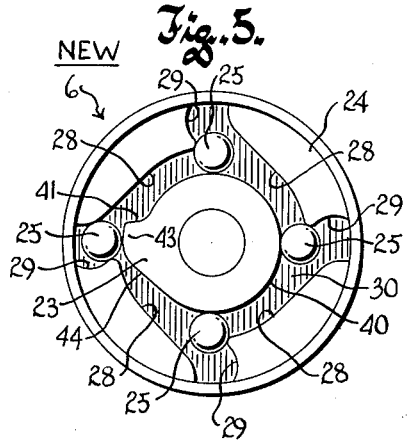
Fig. 5. NEW 3,040,853
OVERRUNNING CLUTCH
Ib H. Svendsen, Milwaukee, Wis., assignor to Briggs & Stratton Corporation, Milwaukee, Wis., a corporation of Delaware
Filed Jan. 13, 1961, Ser. No. 82,588
2 Claims. (Cl. 192—45)

This invention relates to overrunning clutches and refers more particularly to improvements in a unidirectional or overrunning clutch of the type wherein one or more balls are wedgingly confined between coaxial driving and driven elements upon rotation of the driving element in one direction relative to the driven element, to constrain the driven element to rotate with the driving element, but wherein the balls are disengaged from both elements upon relative rotation of the driving element in the opposite direction, to leave the elements free of one another.

An overrunning clutch of the type here under consideration is incorporated in the spring motor engine starter disclosed in the copending application of Charles L. Coughlin et al., Serial No. 18,754, filed March 30, 1960, now Patent No. 2,999,489, granted September 12, 1961. In that device the driving and driven members of the overrunning clutch are mounted for rotation on a common upright axis, and the driving member is connected with a windup spring which imparts torque to it. When the driving member rotates under the influence of the windup spring, it carries a ball into wedging engagement with the driven member, and the wedging of the ball between the driving and driven members constrains them to rotate in unison. The driven member is drivingly connected with an engine crankshaft, and when the engine starts it rotates the driven member faster than the driving member, causing the ball to be disengaged from its wedging confinement between the two members and displaced into a radially outwardly extending slot or pocket in the driven member, where it does not interfere with relative rotation between the two members.

The ball or balls since there usually are more than one, normally tend to remain in contact with the driving member by reason of the fact that the bottom surfaces of the ball slots or pockets in the driven member are downwardly and radially inwardly inclined, and gravity bias upon the balls is relied upon to hold them in positions where the leading face of a lobe on the driving member can engage and carry a ball into wedging engagement with a tangential radially inwardly facing surface on the driven member.

At times the clutch in the spring motor engine starter of the aforesaid copending application failed to engage, especially when the driving member rotated at high velocity. The cause of such failure was difficult to determine because there seemed to be nothing inherent in the clutch design or arrangement that would allow failure to occur. It was finally learned, however, that because of the relatively large inertia possessed by the balls, and the high speed at which the driving member rotated under the influence of the windup spring, the balls sometimes failed to roll far enough into the orbit of the leading face of the lobe on the driving member to assure its being carried thereby into wedging engagement with the driven member. Instead, the lobe on the rapidly revolving driving member merely imparted glancing blows to the balls which tended to kick them radially outwardly into the ball slots in the driven member, allowing the driving member to rotate freely.

The present invention has for its object the provision of a driving member for an overrunning clutch of the character described which insures consistent operation of the clutch by allowing the ball elements to be at all times disposed in positions from which they will be carried along into wedging engagement with the driven member by the lobe on the driving member, regardless how fast it may rotate.

More specifically the present invention has for its object the provision of a driving member for an overrunning clutch of the character described which has its peripheral surface so formed that the balls remain substantially within the orbit of the leading face of its lobe, under gravity bias, during a major portion of its revolution, so that the balls cannot be kicked into the ball slots in the driven member when the driving member begins to rotate at high speed in the clutch engaging direction, but are instead positively propelled into wedging confinement between the two members.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 3 is a sectional view taken on the plane of the line 3—3 in FIGURE 1;

FIGURE 4 is a diagrammatic plan view of an overrunning clutch incorporating a prior type of drive member; and FIGURE 5 is a view similar to FIGURE 4 but showing an overrunning clutch which incorporates the drive member of this invention.

Figure 1:
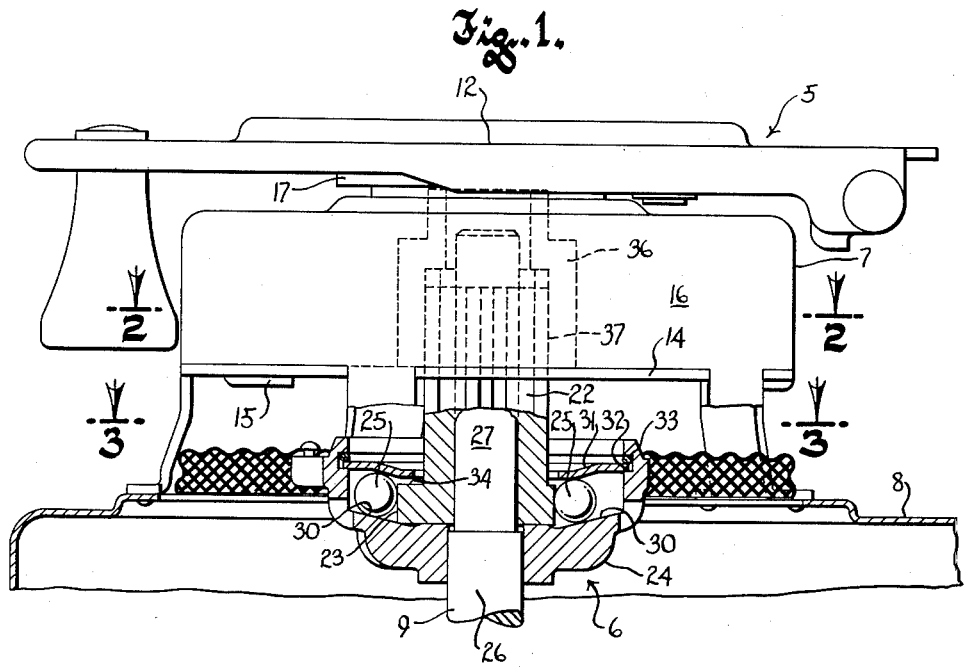
FIGURE 1 is a vertical sectional view of a spring motor starter for internal combustion engines incorporating an overrunning clutch which embodies the principles of this invention.
Figure 2:
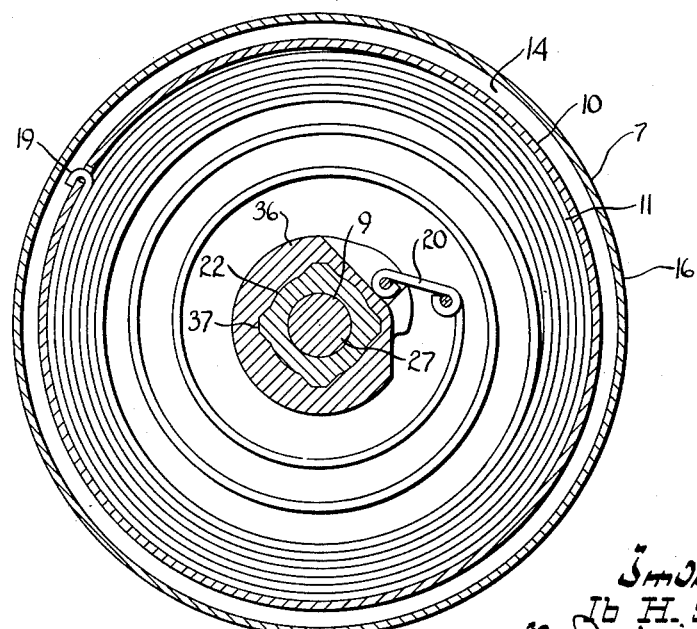
FIGURE 2 is a sectional view taken on the plane of the line 2—2 in FIGURE 1.

Referring now to the accompanying drawings, in which like numerals designate like parts throughout the several views, the numeral 5 designates generally a spring motor engine starter similar to that of the aforesaid copending application, Serial No. 18,754, and which incorporates an overrunning clutch, designated generally by 6, which embodies the principles of this invention. It will be understood that the overrunning clutch 6 is applicable to a variety of installations, the spring motor engine starter herein shown being merely illustrative, and as brought out in the aforesaid copending application, the same type of overrunning clutch also has utility, for example, in a common type of rewinding rope starter.

The starting motor comprises in general an inverted cup-shaped starting motor housing 7, which is fixed on the blower shroud 8 of an engine on which the starting motor is mounted, substantially concentrically with the engine crankshaft 9, a spring casing or carrier 10 which is rotatably mounted in the starting motor housing 7 and which carries a spirally coiled spring 11, a medially hinged crank arm 12 accessibly mounted on top of the starting motor housing and connected with the spring carrier for rotating the same, and the overrunning clutch mechanism 6 which provides a driving connection between the spring and the engine crankshaft. At its bottom the starter housing is closed by an annular plate 14 supported on lugs 15 turned inwardly from the bottom of the cylindrical side wall 16 of the starter motor housing. A pawl and ratchet mechanism 17 jointly carried on the top wall of the starter motor housing and on the crank arm prevents reverse rotation of the crank arm as the spring is wound. It will be understood that suitable means are also provided for preventing rotation of the flywheel during winding of the spring and until engine starting is accomplished, which means may comprise a stop (not shown) releasably engageable with a portion of the flywheel, as described in detail in the aforesaid copending application.

The spring 11 is spirally coiled within the cylindrical side wall of the spring carrier 10, and is edgewise confined between the bottom plate 14 of the starter housing and the top wall of the spring carrier. It is connected to the spring carrier, to be wound by rotation of the latter, by having its outer end portion bent into a hook, as at 19, and engaged in an upright slot in the spring carrier side wall.

As the spring unwinds it imparts the energy stored in it to the overrunning clutch mechanism 6, which provides a connection between the spring and the engine crankshaft. The overrunning clutch mechanism comprises a cup-shaped driven member 24 coaxially secured to the engine crankshaft 9, a driving member 22 coaxial with the driven member and having a hub portion 23 disposed in the cup of the driven member, and a number of balls 25, which are adapted to be wedgingly engaged between the driving and driven members when the driving member tends to rotate faster than the driven member, but which disengage themselves from the drive member when the driven member tends to rotate faster, it being understood that the direction of rotation is always the same.

The connection between the spring 11 and the driving member 22 of the overrunning clutch mechanism is provided by a collar 36 which is splined on the upper portion 37 of the drive member and to which the inner end of the spring is connected by link 20. The splined connection between the driving member 22 and the collar 36 may have any suitable form, and in the present instance it consists of a more or less star shaped cross section of the driving member, and a correspondingly shaped bore in the collar. This splined connection should be fairly loose to assure that the collar will be free to move axially relative to the driving member, thereby accommodating variations in the axial location of the spring casing 10 relative to the driving member, such as are inevitably encountered in manufacturing.

The driven member 24 of the overrunning clutch mechanism, as stated is substantially cup-shaped and is secured to the engine crankshaft by being keyed or threaded onto a portion 26 thereof which is just below its upper end. The driving member 22 is freely rotatable on the coaxial plain upper end portion 27 of the crankshaft.

The driven member 24 is provided at its interior with tangential radially inwardly facing side wall cam surfaces 28 against which the balls 25 can be wedgingly engaged by a lobe 43 on the hub portion 23 of the driving member, and which extend in one circumferential direction from one side of substantially radial slots 29 into which the balls are propelled by centrifugal force when the clutch is disengaged due to the driven member turning faster than the driving member. The balls are gravity biased radially inwardly of the driven member by reason of the fact that its bottom surface 30 is inclined downwardly and toward the axis of the clutch.

To confine the balls against upward displacement out of the cup-shaped driven member, its top is closed by an annular retainer 31, the outer edge of which rests on a circumferential ledge 32 on the driven member and which is held in place by an expansion type spring ring 33 overlying its outer marginal edge portion and engaged in a circumferential inwardly opening groove in the rim portion of the driven member. The inner edge portion of the annular retainer 31 overlies the upper surface 34 of the hub portion 23 on the driving member, and the driving member is free for limited axial motion between the bottom surface 30 of the cup-shaped driven member and the retainer 31.

The gravity bias on the balls 25, due to the downward and radially inward inclination of the bottom surface 30 of the driven member, as stated tends to hold them against the side of the hub portion 23 on the driving member. Heretofore, as shown in FIGURE 4, this hub portion (designated by 23') had its peripheral surface 40' formed to a generally spiral configuration, with the ends of the spiral connected by a surface 41' which faced substantially circumferentially in the direction of driving member rotation. Thus, as the driving member rotated, the spiral surface 40' receded from all of the balls 25 due to its progressively decreasing radius, and if the driving member was turned at a substantially high speed the balls, due to their inertia, did not remain in contact with it. As a result, when the forwardly facing surface 41' came around to one of the balls, it merely gave the ball a glancing blow that sent it back out into its slot 29 in the driven member, instead of carrying it along and wedging it against the adjacent tangential side wall surface 28 of the driven member.

The hub portion 23 of the driving member of this invention, which is best seen in FIGURE 5, has its peripheral surface 40 formed with a constant radius for more than 180° from its junction with the leading face 41 of the lobe 43, and then diverges from the axis of the driving member to form the rear face 44 of the lobe. The lobe actually constitutes less than 90° of the hub portion 23, and as shown its leading face 41 rises abruptly from the adjacent peripheral surface of the hub portion. By reason of this configuration of the hub portion, and with a driven member having four circumferentially equispaced ball slots 29, as shown, with a ball for each slot, there are always no less than three balls which are in positions to be propelled into wedging engagement with the tangential side wall cam surfaces 28 of the driven member. The peripheral surface of the hub portion does not recede axially inwardly from the balls as the driving member rotates, as was the case with the prior structure, but holds the balls at a constant distance from the clutch axis at locations where they can be readily and positively engaged by the leading face 41 of the lobe 43.

The taper of the rear face 44 of the lobe 43 is sufficiently gradual to enable the balls to be cammed outwardly into the slots 29 when the driven member rotates at a higher speed than the driving member, and, of course, such outward propulsion of the balls is promoted by centrifugal force.

From the foregoing description, taken together with the accompanying drawings, it will be apparent that this invention provides an overrunning clutch having a driving member which can be easily and inexpensively manufactured and which makes for highly dependable operation of the clutch mechanism.

What is claimed as my invention is:

1. A unidirectional clutch of the type comprising a cup-shaped rotatable driven member having a bottom wall and a side wall, the side wall having a radially inwardly opening ball slot and a radially inwardly facing cam surface which extends in one circumferential direction from one side of the ball slot and converges toward the axis of the clutch, a driving member coaxial with the driven member and having a hub portion disposed in the cup of the driven member, the hub portion having a lobe projecting radially therefrom toward the side wall of the cup, the lobe having a leading face which rises abruptly from the peripheral surface of the hub and faces in the direction the driving member turns when it drives the driven member, a ball between the side wall of the cup-shaped driven member and the hub of the driving member, said ball being freely movable from a position in the ball slot where it is beyond the orbit of the radially outward extremity of the lobe, to a position engaging the peripheral surface of the hub directly in front of the leading face of the lobe to be carried thereby toward said converging cam surface on the driven member, the diameter of the ball being greater than the distance between the peripheral surface of the hub directly in front of the leading face of the lobe and the portion of the converging cam surface nearest the axis of the clutch so that upon being advanced by the lobe the ball is wedged against said cam surface and thereby drivingly connects the driving and driven members, said clutch being characterized by: the fact that the peripheral surface of the hub is concentric to the axis of the clutch for more than 180° from its junction with the leading face of the lobe and then diverges from the clutch axis to form the trailing face of the lobe; and by the fact that the bottom of the cup-shaped driven member slopes downwardly and inwardly so that when the clutch is disposed with its axis upright and the cup-shaped driven member facing upwardly, gravity biases the ball out of its slot toward the center of the clutch and into engagement with the peripheral surface of the hub, the fact that the peripheral surface of the hub is concentric to the clutch for more than 180° from its junction with the leading face of the lobe greatly increasing the odds that the ball will be in position to be carried along with the advancing lobe into wedging engagement with the cam surface on the driven member.

2. The unidirectional clutch of claim 1, further characterized by the fact that the driven member has at least two diametrically opposite ball slots, two of said cam surfaces, and two balls, so that one of said balls is always in position to be carried along by the advancing lobe and into wedging engagement with one of the cam surfaces whether the axis of the clutch is vertical or not.

References Cited in the file of this patent

UNITED STATES PATENTS

| | | |
|---|---|---|
| 1,375,576 | Duca | Apr. 19, 1921 |
| 1,914,618 | Rudqvist | Jan. 20, 1933 |
| 2,232,090 | Anderson | Feb. 18, 1941 |

FOREIGN PATENTS

| | | |
|---|---|---|
| 579,182 | Great Britain | July 25, 1946 |